United States Patent [19]

Mark

[11] 4,153,595
[45] May 8, 1979

[54] FLAME RETARDANT POLYCARBONATE COMPOSITION

[75] Inventor: Victor Mark, Evansville, Ind.

[73] Assignee: General Electric Company, Pittsfield, Mass.

[21] Appl. No.: 831,915

[22] Filed: Sep. 9, 1977

Related U.S. Application Data

[63] Continuation of Ser. No. 429,125, Dec. 28, 1973, abandoned.

[51] Int. Cl.$^2$ ............................................. C08K 5/42
[52] U.S. Cl. ..................... 260/45.7 S; 260/45.7 R; 260/45.75 B
[58] Field of Search ................. 260/45.7 SF, 47 XA

[56] References Cited

U.S. PATENT DOCUMENTS

| | | | |
|---|---|---|---|
| 2,815,301 | 12/1957 | Murdock | 260/45.7 SF |
| 2,956,956 | 10/1960 | Strauss et al. | 252/149 |
| 3,576,617 | 4/1971 | Di Bella | 71/103 |
| 3,775,367 | 11/1973 | Nouvertne | 260/45.7 SF |
| 3,836,490 | 9/1974 | Bockmann et al. | 260/47 XA |
| 3,845,007 | 10/1974 | Nouvertne et al. | 260/47 XA |
| 3,875,107 | 4/1975 | Nouvertne et al. | 260/47 XA |
| 3,876,580 | 4/1975 | Nouvertne et al. | 260/47 XA |
| 3,912,688 | 10/1975 | Schiller et al. | 260/47 XA |
| 3,971,756 | 7/1976 | Bialous et al. | 260/47 XA |

*Primary Examiner*—Hosea E. Taylor
*Assistant Examiner*—R. A. White
*Attorney, Agent, or Firm*—Morgan, Finnegan, Pine, Foley & Lee

[57] ABSTRACT

A flame retardant polycarbonate composition comprising in admixture an aromatic carbonate polymer and a flame retardant additive which may be the alkaline earth metal salts of halogenated methanesulfonic acids or mixtures thereof, or mixtures of the alkali metal salts and the alkaline earth metal salts.

9 Claims, No Drawings

FLAME RETARDANT POLYCARBONATE COMPOSITION

This is a continuation of application Ser. No. 429,125, filed Dec. 28, 1973, now abandoned.

This invention is directed to a flame retardant polycarbonate composition and in particular an aromatic polycarbonate containing in admixture therewith a particular flame retardant additive which comprises the alkali metal salts of halogenated methanesulfonic acid.

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products One particular set of conditions employed as a measuring standard for flame retardancy is set forth in Underwriters Laboratories, Inc, Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

From U.S. Pat. No. 3,775,367, it is known that when certain perfluoroalkane alkali metal or ammonium sulphonates or mixtures thereof are added to polycarbonates, improved flame resistance in the polycarbonate is achieved.

DESCRIPTION OF THE INVENTION

It has now been surprisingly discovered that an aromatic polycarbonate can be made flame retardant by incorporating with the aromatic polycarbonate minor amounts of certain additives, which additives are inert and do not degrade the aromatic polycarbonate. The particular additive employed herein is unique in that even very minor amounts render the aromatic polycarbonate flame retardant. The amount of the additive employed herein can vary, preferably, from 0.01 to about 10 weight percent based on the weight of the aromatic polycarbonate.

More specifically, the particular additive of this invention is the metal salt of a halogenated methanesulfonic acid and includes mixtures of the metal salt of halogenated methanesulfonic acids. The metal salt employed in the practice of this invention is either the alkaline earth metal salt or mixtures thereof or mixtures of the alkali metal salt and alkaline earth metal salt. The metals of these groups are sodium, lithium, potassium, ribidium, cesium, beryllium, magnesium, calcium, strontium and barium. The halogenated methanesulfonic acid contains up to three halogen functions and may be either bromine, chlorine or fluorine. They can also be mixed halogen functions. Obviously, if less than three halogen functions are employed, the remaining valence is hydrogen.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

Ninety-nine (99) parts of an aromatic polycarbonate, prepared by reacting 2,2-bis(4-hydroxyphenyl)propane and phosgene in the presence of an acid acceptor and a molecular weight regulator and having an intrinsic viscosity of 0.57 is mixed with 1 part of a finely ground dehydrated additive listed in Table I by tumbling the ingredients together in a laboratory tumbler. The resulting mixture is then fed to an extruder, which extruder is operated at about 265° C., and the extrudate is comminuted into pellets.

The pellets are then injection molded at about 315° C. into test bars of about 5 in. by ½ in. by about 1/16-⅛ in. thick. The test bars (5 for each additive listed in the Table) are subject to the test procedure set forth in Underwriters' Laboratories, Inc. Bulletin UL-94, Burning Test for Classifying Materials. In accordance with this test procedure, materials so investigated are rated either SE-O, SE-I or SE-II based on the results of 5 specimens. The criteria for each SE rating per UL-94 is briefly as follows:

"SE-O": Average flaming and/or glowing after removal of the igniting flame shall not exceed 5 seconds and none of the specimens shall drip flaming particles which ignite absorbent cotton.

"Se-I": Average flaming and/or glowing after removal of the igniting flame shall not exceed 25 seconds and the glowing does not travel vertically for more than ⅛" of the specimen after flaming ceases and glowing is incapable of igniting absorbent cotton.

"Se-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the SE type rating to achieve the particular classification. Otherwise, the 5 bars receive the rating of the worst single bar. For example, if one bar is classified as SE-II and the other four (4) are classified as SE-O, then the rating for all 5 bars is SE-II.

The results of the different additives within the scope of the instant invention are as follows with a control being the aromatic polycarbonate as prepared above without the additive of the type set forth herein.

TABLE 1

| Additive (1.0 weight percent) | Flame Out Time Seconds (Avg.) | No. of Drips Per Test Bar | Rating | Remarks |
| --- | --- | --- | --- | --- |
| CONTROL | 31.6 | 4+ | Burns | |
| Calcium trifluoromethanesulfonate | 7.3 | 1.0 | SE-II | 3 test bars were SE-I |
| Calcium chloromethanesulfonate | 5.6 | 1.2 | SE-II | |
| Mixture (2:1, wt/wt) of sodium trifluoromethanesulfonate and calcium trifluoromethanesulfonate | 2.6 | 1.0 | SE-II | 4 test bars were SE-O |

EXAMPLE II

This Example is set forth to show the effect of a known commercially available flame retardant additive.

A.

Example I is repeated except that in place of the additives employed therein, only 1 part 1,2,5,6,9,10-hexabromocyclododecane is used herein. The results obtained upon evaluating five (5) test bars are the same as obtained for the Control shown in Table 1. above.

B.

Part A above is repeated but using 5 weight percent of the above additive, namely 1,2,5,6,9,10-hexabromocyclododecane. The results obtained are the same as obtained in Part A. above.

C.

Part A. above is repeated but using 10 weight percent of the above additive, namely, 1,2,5,6,9,10-hexabromocyclododecane. At this level of additive, test bars are rated SE-II. However, the polycarbonate is badly degraded as evidenced by severe dark streaking of the molded test bars, which degradation does not occur with the additives of the instant invention.

EXAMPLE III

Example II is repeated except that hexabromobiphenyl is employed herein. The results obtained are essentially the same as those of Example II.

EXAMPLE IV

Example II is repeated except that the additive employed herein is a combination of antimony oxide and a material which is a mixture of polychlorinated biphenyl (Aroclor by Monsanto Company). The proportion of the ingredients of the additive employed in this example is based on 3 parts of chlorine per 1 part of antimony. The results obtained at 1 weight percent and 5 weight percent amounts are the same as in Example III.

However, at the higher amount, namely 10 weight percent, flame retardancy effect is noted with, but again, severe degradation of the polycarbonate, as evidenced by the substantial reduction in the intrinsic viscosity of the molded test bars. As molded, the intrinsic viscosity of the test bars with 1 weight percent of the above additive is about 0.50. The intrinsic viscosity of the molded test bars containing 10 weight percent of the flame retardant additive of this Example is 0.253. This shows the severe degradation of the polycarbonate when employing this type of well known retardant.

In the practice of this invention, aromatic carbonate polymers are rendered flame retardant by the addition of certain particular additives which are the metal salts of halogenated methanesulfonic acids. The amount of the additives employed in the practive of this invention may vary from 0.01 to up to that amount which, after further increasing of such an amount, does not materially increase the flame retardant properties of the carbonate polymer. This is generally up to about 10 weight percent based on the weight of the aromatic carbonate polymer but may be higher. The amount of the additive to be employed can also be a function of the degree of flame retardancy desired.

It is not exactly understood how the additive of this invention functions or how such minor amounts can act as an effective flame retardant for the aromatic carbonate polymer. Analysis of the composition of this invention after being subjected to a fire temperature of about 600° C. showed an unusually high percentage of remaining char. This leads one to hypothesize that the additive may act as a cross-linking agent when the aromatic carbonate polymer is subjected to fire temperatures. However, it is emphasized that this is only theory and should not be construed as actually occurring.

As indicated previously, the additive of the instant invention comprises the alkaline earth metal salts of a halogenated methanesulfonic acid or mixtures thereof or mixtures of the alkaline earth metal salts of a halogenated methanesulfonic acid and an alkali metal salt of a halogenated methanesulfonic acid. While a great number of such salts are set forth in the tables of the Examples of the instant invention, these are only a representative sample of the additives of this invention. The sodium, calcium, magnesium, potassium, strontium, lithium, barium, rubidium and cesium salts of other halogenated methanesulfonic acids can be employed in place of those of the Examples with the same effective flame retardancy being achieved. These metal salts of halogenated methanesulfonic acids are:

strontium trifluoromethanesulfonate
a mixture of potassium trifluoromethanesulfonate and calcium trifluoromethanesulfonate
barium trifluoromethanesulfonate For the practice of this invention, the additive is generally prepared by well known methods in the art. If the halogenated methanesulfonic acid is available, its simple neutralization to pH 7.0 by the alkali and alkaline earth metal hydroxide, oxide and carbonate provides the fire retardant metal salt. Alternatively, the salt can also be prepared from the anhydride or the chloride of the halomethanesulfonic acid. The latter case applies to the trichloromethanesulfonic acid salts, where the controlled hydrolysis of the commercially available trichloromethanesulfonyl chloride yields the desired product. The salts of trifluoromethanesulfonic acid can be obtained by neutralization of the free acid or by the hydrolysis of the anhydride, both being the product of commerce. The salts then are dried before admixing them with the polycarbonate.

In the practice of this invention, any of the aromatic polycarbonates can be employed herein. However, particularly useful are the aromatic polycarbonates prepared by reacting a dihydric phenol, such as bisphenol-A (2,2'bis(4 hydroxyphenyl) propane) with a carbonate precursor. Typical of some of the dihydric phenols that may be employed in the practice of this invention are bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl) propane, (3,3'-dichloro-4,4'-dihydroxydiphenyl)methane. Other dihydric phenols of the bisphenol type are also available and are disclosed in U.S. Pat. Nos. 2,999,835, 3,028,365 and 3,334,154.

In addition, the reaction is carried out with the carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant aromatic carbonate polymer composition comprising in admixture an aromatic carbonate polymer and 0.01 to about 10.0 weight percent based on the weight of the aromatic carbonate polymer of a metal salt of a halogenated (F, Cl, Br) methanesulfonic acid wherein said metal salt is selected from the group consisting of the alkaline earth metal salts selected from calcium, strontium or barium or mixtures thereof, or mixtures of said alkaline earth metal salts and alkali metal salts in which there is not less than one part of akaline earth metal salt for each two parts of alkali metal salt.

2. The composition of claim 1 wherein said metal salt is an alkaline earth metal salt selected from calcium, strontium or barium.

3. The composition of claim 2 wherein said alkaline earth metal salt is calcium trifluoromethanesulfonate.

4. The composition of claim 2 wherein said alkaline earth metal salt is strontium trifluoromethanesulfonate.

5. The composition of claim 2 wherein said alkaline earth metal salt is barium trifluoromethanesulfonate.

6. The composition of claim 2 wherein said alkaline earth metal salt is calcium chloromethanesulfonate.

7. The composition of claim 1 wherein said metal salt is a mixture of said alkaline earth metal salt and an alkali metal salt.

8. The composition of claim 7 wherein said metal salt mixture is a mixture of calcium trifluoromethanesulfonate and sodium trifluoromethanesulfonate.

9. The composition of claim 7 wherein said metal salt mixture is a mixture of calcium trifluoromethanesulfonate and potassium trifluoromethanesulfonate.

* * * * *